United States Patent [19]

Olsen et al.

[11] Patent Number: 5,037,239
[45] Date of Patent: Aug. 6, 1991

[54] UNDERGROUND CONCRETE VAULT STRUCTURE FOR HAZARDOUS LIQUID STORAGE TANKS

[75] Inventors: Gordon L. Olsen, Pleasant Grove; Thad N. Beal, Lehi, both of Utah

[73] Assignee: Olsen-Beal Associates, Orem, Utah

[21] Appl. No.: 651,007

[22] Filed: Feb. 5, 1991

[51] Int. Cl.[5] .............................................. B09B 1/00
[52] U.S. Cl. .................................... 405/128; 52/169.5
[58] Field of Search ................. 405/128, 129, 52, 53, 405/54, 55, 59; 52/79.1, 79.9, 79.11, 79.14, 169.5, 169.7, 169.8, 274

[56] References Cited

U.S. PATENT DOCUMENTS

| | | | |
|---|---|---|---|
| 4,425,743 | 1/1984 | Bartur | 405/53 X |
| 4,632,602 | 12/1986 | Hovnanian | 405/52 X |
| 4,638,920 | 1/1987 | Goodhues, Jr. | |
| 4,717,285 | 1/1988 | Pulkkinen | 405/55 |
| 4,787,772 | 11/1988 | Wagner | |
| 4,818,142 | 4/1989 | Cochran | 405/55 |
| 4,826,445 | 5/1989 | Lindquist et al. | |
| 4,863,311 | 9/1989 | Pirk | 405/128 |
| 4,875,805 | 10/1989 | Gross | 405/128 |
| 4,881,847 | 11/1989 | Sanders | 405/52 |
| 4,950,105 | 8/1990 | Meess | 405/128 |
| 4,973,195 | 11/1990 | Sweeney et al. | 405/128 |
| 4,974,379 | 12/1990 | Phillips | 405/128 |

FOREIGN PATENT DOCUMENTS

| | | |
|---|---|---|
| 1279141 | 11/1961 | France . |
| 1299844 | 6/1962 | France . |
| 57-158436 | 9/1982 | Japan . |
| 466551 | 12/1968 | Switzerland . |

OTHER PUBLICATIONS

"SUREVAULT" Underground Storage Vaults, by SCV Corporation Environmental Protection Products, 7 Pages.
"CONVAULT", A Pollution Solution, by AMCOR, 2 Pages.

Primary Examiner—Dennis L. Taylor
Assistant Examiner—J. Russell McBee
Attorney, Agent, or Firm—Mallinckrodt & Mallinckrodt

[57] ABSTRACT

A fluid tight structure or vault particularly suited to having hazardous liquid storage tanks located therein for storage of liquids such as gasoline, and used as a replacement for underground storage tanks in facilities such as gasoline stations, truck stops, or industrial plants, so that the storage tanks are available for periodic inspection and any leakage from such tanks is contained within the structure to avoid contaminating surrounding ground, is constructed of prefabricated concrete panels having weldable material embedded therein where the panels meet so that the panels may be seal welded together along adjacent edges to provide the fluid tight structure. Thus, floor panels have plates of weldable material embedded therein over which wall panels having bottom edges of weldable material are placed and welded. Adjacent side edges of the wall panels are also welded. The welds provide seals between the various panels and provides structural strength to hold the panels in assembled position. The structure is preferably constructed below ground level with a structure roof of concrete panels positioned at ground level and designed to have vehicles travel thereover. The floor of the structure preferably extends beyond the perimeter of the walls to form a lip which is covered with earth to keep the structure from floating upwardly.

36 Claims, 6 Drawing Sheets

UNDERGROUND CONCRETE VAULT STRUCTURE FOR HAZARDOUS LIQUID STORAGE TANKS

BACKGROUND OF THE INVENTION

1. Field

The invention relates to the field of underground storage tanks, particularly for storage of hazardous liquids such as gasoline, and to structures for housing such storage tanks.

2. State of the Art

Underground storage tanks are used for storage of a variety of hazardous liquids such as gasoline, oil, diesel fuel, other toxic substances, and chemicals. Such tanks are most often used in gas stations, truck stops, and industrial and commercial facilities. Most of these tanks have capacities between 500 and 20,000 gallons and are made of unprotected, welded sheet steel which is subject to corrosion and other forces when buried. Such tanks are likely to leak after being buried for a number of years. More recently some tanks have been made of fiberglass, but such tanks are subject to cracking or other problems which cause these tanks to leak also.

In the event of a leak developing in a tank, the gasoline or other hazardous fluid will leak into the ground. Leakage may occur from such tanks over a relatively long period of time prior to detection. This pollutes the ground and usually leads to extremely costly cleanup operations once the leak is discovered. With existing underground tanks an average of twenty-five years old, and with the risk of leaks increasing substantially after about twelve years in the ground, it is currently estimated that up to about twenty percent of underground storage tanks are probably leaking.

Because of the growing environmental problems associated with leaking underground storage tanks, the U.S. Environmental Protection Agency has recently adopted new regulations requiring regular leakage testing of underground storage tanks and the carrying of insurance policies to cover the costs of any required environmental cleanup. Complying with these new regulations significantly adds to the cost and responsibility of owning and operating underground storage tanks. In many cases, the required insurance, if available at all, is so expensive independent gas station owner cannot afford it. The Environmental Protection Agency's new regulations do not apply, however, when the storage tanks themselves are not buried but are placed within a structure where they can be inspected and where any leakage can be contained. Hence, placing storage tanks within a structure, either above ground or under ground, is a way to both avoid EPA regulations and prevent environmental problems.

U.S. Pat. No. 4,638,920 discloses a steel enclosure or vault built around a tank. The enclosure and tank, as a unit, is then lowered into the ground. With such an enclosure unit, size and weight can be a problem in terms of transportation and lowering of the unit into the excavation. Further, since the enclosure is made of steel, it is subject to the same corrosion activity as the tank would be.

Prefabricated concrete enclosures or vaults for storage tanks are available from SCV Corporation under the trademark "Surevault". These enclosures are manufactured in sections and assembled on site. The enclosures are made up of an open top, bottom section with walls which extend upwardly so as to form a structure which will hold the entire contents of a tank located therein should the tank completely fail. A precast collar section is placed on top of the bottom section walls to form the upper walls, and deck panels are placed thereon to cover the top. As with the steel enclosure of U.S. Pat. No. 4,638,920, only certain maximum sizes of prefabricated units can be made for transportation and, because the bottom section include partial walls, the size of the enclosures are limited to holding a single tank. For multiple tanks, multiple enclosures are used.

Swiss patent No. 466,551 similarly shows a tank enclosure made up of lower and upper prefabricated sections that are joined together to form the enclosure.

Japanese Patent No. 57-158436 shows a method of constructing a concrete underground room. No particular use is shown for the room. The walls are assembled from precast concrete panels and the excavation is done below these walls to lower the walled structure to the desired depth. When at the desired depth, the floor is formed.

There remain a need for a structure made of precast components which can be easily assembled at a job site into a structure for housing storage tanks, which is sealed to be fluid proof, and which can be assembled in various different sizes so as to accommodate various numbers of tanks.

SUMMARY OF THE INVENTION

According to the invention, a fluid tight structure includes a concrete floor having elongate floor plates of a weldable material sealingly secured in the floor and defining a perimeter of the structure. Precast concrete wall panels have a bottom edge and opposite side edges of a weldable material. The wall panels are positioned on the concrete floor so that the bottom edge portions of the wall panels are adjacent to or partially overlie the elongate floor plates and so that the side edge portions of the wall panels are adjacent to one another. The bottom edge portions of the wall panels are seal welded to the floor plates in the floor while adjacent side edges of the wall panels are also seal welded. The welds not only seal the seams between adjacent wall panels and the bottom of the wall panels and the floor, but also provide structural integrity to the structure. The welded walls and floor provide a fluid tight structure within which storage tanks may be located. Any leakage from the storage tanks will be confined to the fluid tight structure and cannot leak into the surrounding ground.

In most instances, a top or roof will be provided for the structure. The structure is preferably located below ground level with the top, preferably comprising precast concrete roof panels supported by the walls, even with ground level to provide a surface over which vehicles may be driven. Means are provided to prevent movement of the roof panels with respect to the walls. The roof panels are preferably sealed to the tops of the walls so that a completely fluid tight structure is formed. An access opening is provided in a roof panel to provide access to the inside of the structure for inspection of the tanks and repair of the tanks if necessary.

Depending upon the size of the structure desired, the concrete floor may be made up of several adjacent floor panels. In such instance, the mating edges of adjacent floor panels are formed of a weldable material so that adjacent panels may be seal welded to one another. The roof panels may be similarly configured.

It is preferred that in addition to the seal welding, a plastic sealing material such as a neoprene foam be secured in place between adjacent edges of the wall panels and floor panels to provide a double liquid seal.

In a preferred embodiment of the invention, the floor panels extend beyond the perimeter of the walls a distance so that when covered with earth, such panels will resist any tendency for the structure to rise or float in the event of a high water table, or other circumstance which would cause such structure or an underground tank to float.

The structure is also preferably provided with an alarm system to detect leakage from a tank as by detecting fumes or toxic gases in the structure, and a ventilation system to ventilate the structure in the event fumes or toxic gases are detected.

The structure is designed so that all panels used in its construction may be precast at a remote site and transported to the construction site for assembly. The construction site is excavated, if the structure is to be located underground, and prepared for the structure. Floor panels are lowered into the excavation, such as with a mobile crane, and assembled, followed by positioning of the walls, storage tanks, and roof. This allows rapid construction of the structure with minimum downtime of the facility, such as a gas station, during construction.

The structure is sized so that the storage tanks therein are readily accessible for periodic inspection.

The invention also contemplates the method of construction of the structure as well as a specific wall panel construction and method of manufacture wherein the concrete is poured into a rectangular frame formed by steel channels with internal bracing to insure the channels remain straight and at right angles during pouring of the concrete and which includes reinforcing for the concrete. The concrete itself may also include reinforcing material such as polypropylene fibers to increase resistance to water or other fluid migration through the concrete and to increase resistance to cracking.

THE DRAWINGS

The best mode presently contemplated for carrying out the invention in actual practice is illustrated in the accompanying drawings, in which:

FIG. 1 is a perspective view of a structure of the invention as assembled and buried underground so that the top of the structure is at ground level;

FIG. 2, a view similar to that of FIG. 1, but with portions of the structure broken away to show the interior of the structure;

FIG. 3, a fragmentary vertical section taken on the line 3—3 of FIG. 1 showing floor, wall, and roof panels, supports, and a tank;

FIG. 4, a top plan view of the floor of the structure of FIG. 1, taken on the line 4—4 of FIG. 1;

FIG. 5, a fragmentary horizontal section taken on the line 5—5 of FIG. 1, showing a corner of the structure;

FIG. 6, a side elevation of a wall panel, a portion of the concrete being broken away to show reinforcing;

FIG. 7, a fragmentary horizontal section taken on the line 7—7 of FIG. 6, showing the interior wall construction;

FIG. 8, a fragmentary vertical section taken on the line 8—8 of FIG. 1, showing the access opening and cover; and FIG. 9, a block diagram showing an alarm system and ventilation system control usable with the invention.

DETAILED DESCRIPTION OF THE ILLUSTRATED EMBODIMENT

Figure 1:
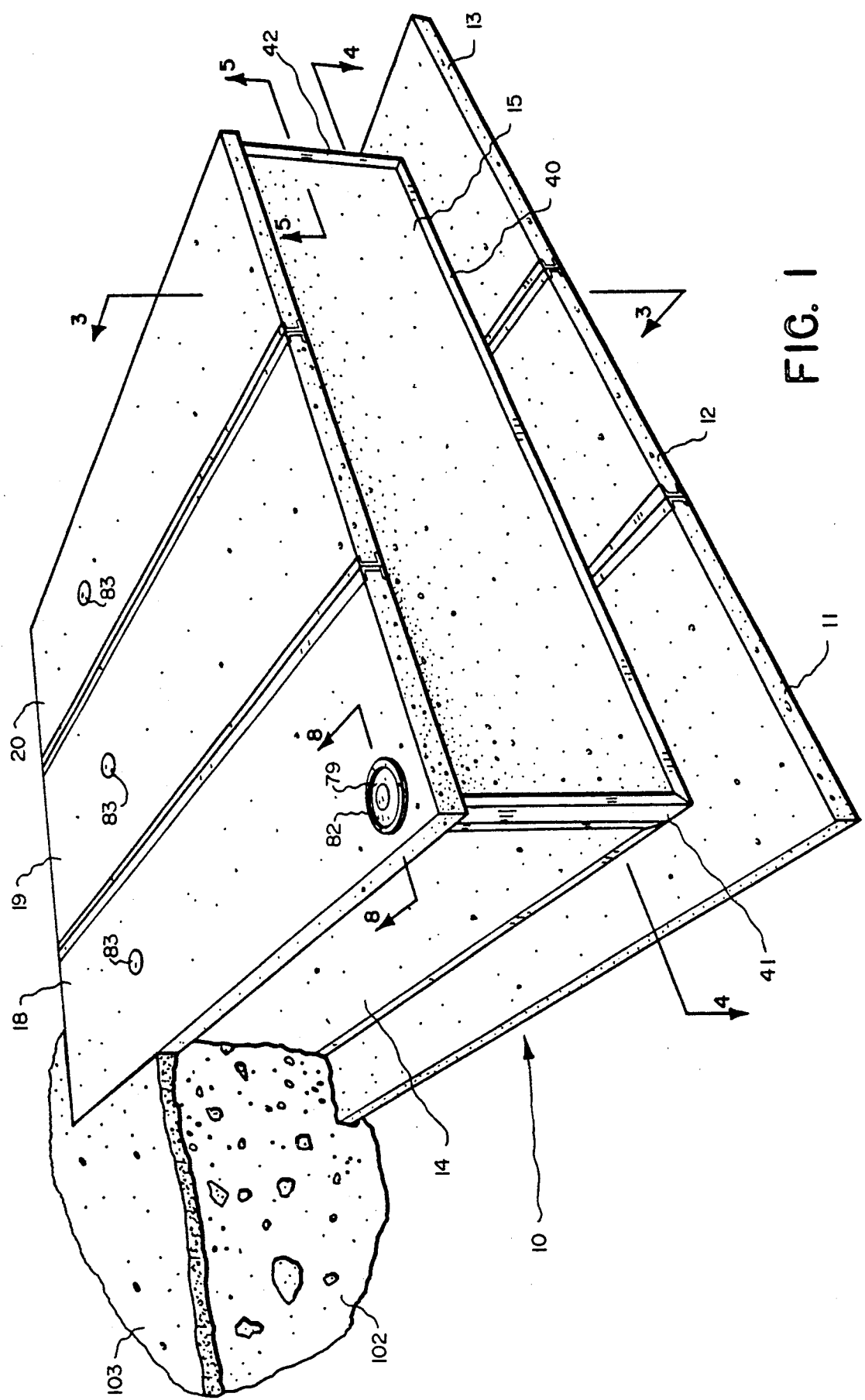
Figure 2:
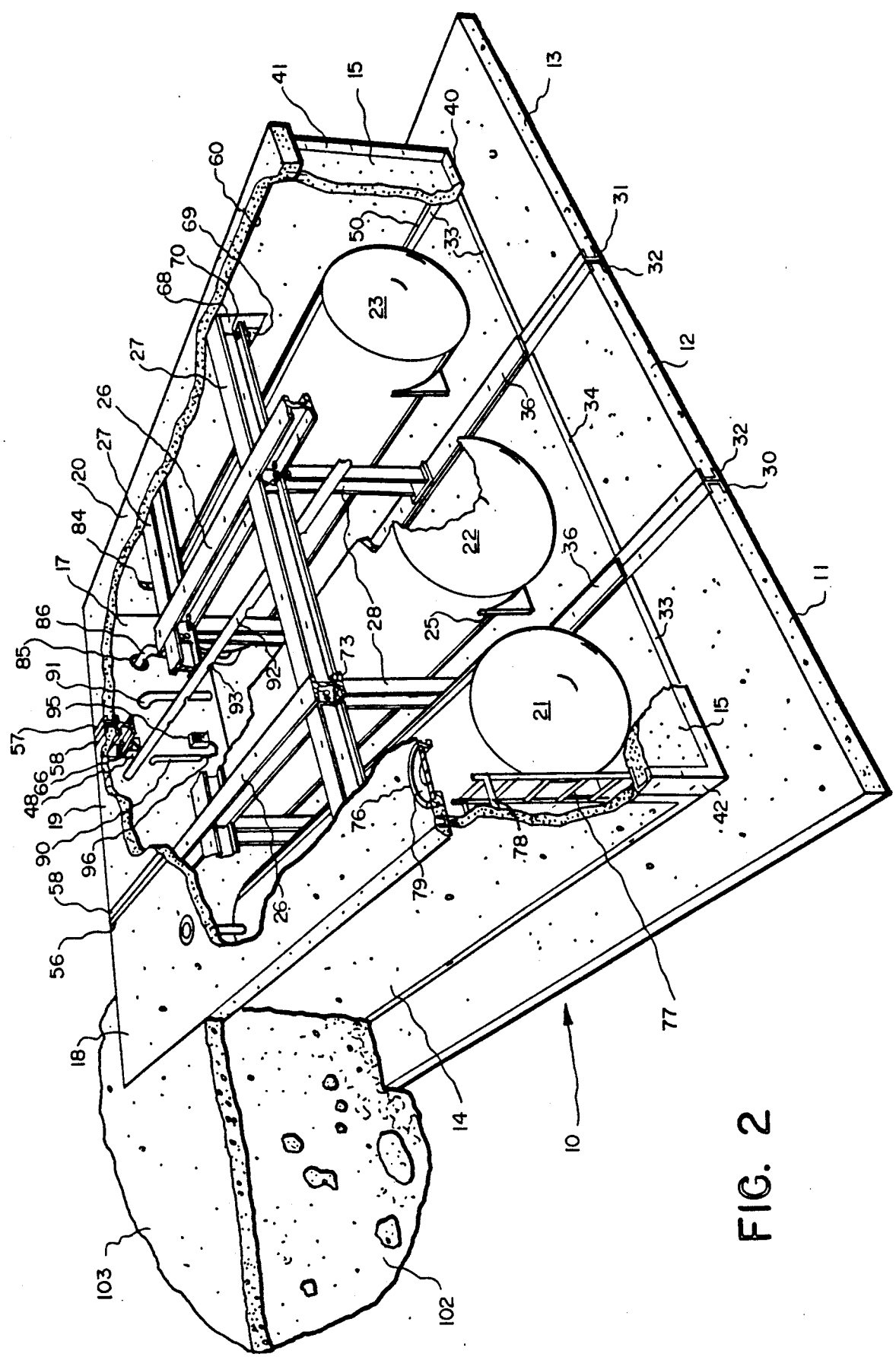

As shown in FIGS. 1 and 2, a structure for housing storage tanks, such as cylindrical steel or fiberglass storage tanks used for storing hazardous liquids such as gasoline, diesel fuel, etc., includes a concrete floor 10, shown as made up of three adjacent precast concrete panels 11, 12, and 13, and precast concrete wall sections 14, 15, 16, and 17. For convenience of description, walls 14 and 16 are considered side walls while walls 15 and 17 are considered end walls. Three adjacent precast concrete roof panels 18, 19, and 20 are placed over the erected wall panels to form a roof for the structure. Prior to placement of the roof panels, storage tanks 21, 22, and 23 are placed into the topless structure to rest on supporting cradles 25 which rest on concrete floor 10.

In multi-tank structures such as shown in the figures, support beams 26 are secured to run between end walls parallel to the length of the tanks and along adjacent edges of adjacent roof panels. Cross support beams 27 may also be provided if necessitated by the size of the structure. Uprights 28 provide additional support to support beams 26 and 27.

The floor panels are each constructed so that edges which are adjacent to other floor panel edges are formed of a weldable material. Thus, floor panels 11 and 13 are constructed to each have a longitudinal edge 30 and 31, respectively, of a weldable material while floor panel 12 has opposite longitudinal edges 32 made of similar weldable material. This weldable material may conveniently take the form of steel channel placed to form the appropriate edges during casting of the concrete floor panels.

Figure 3:
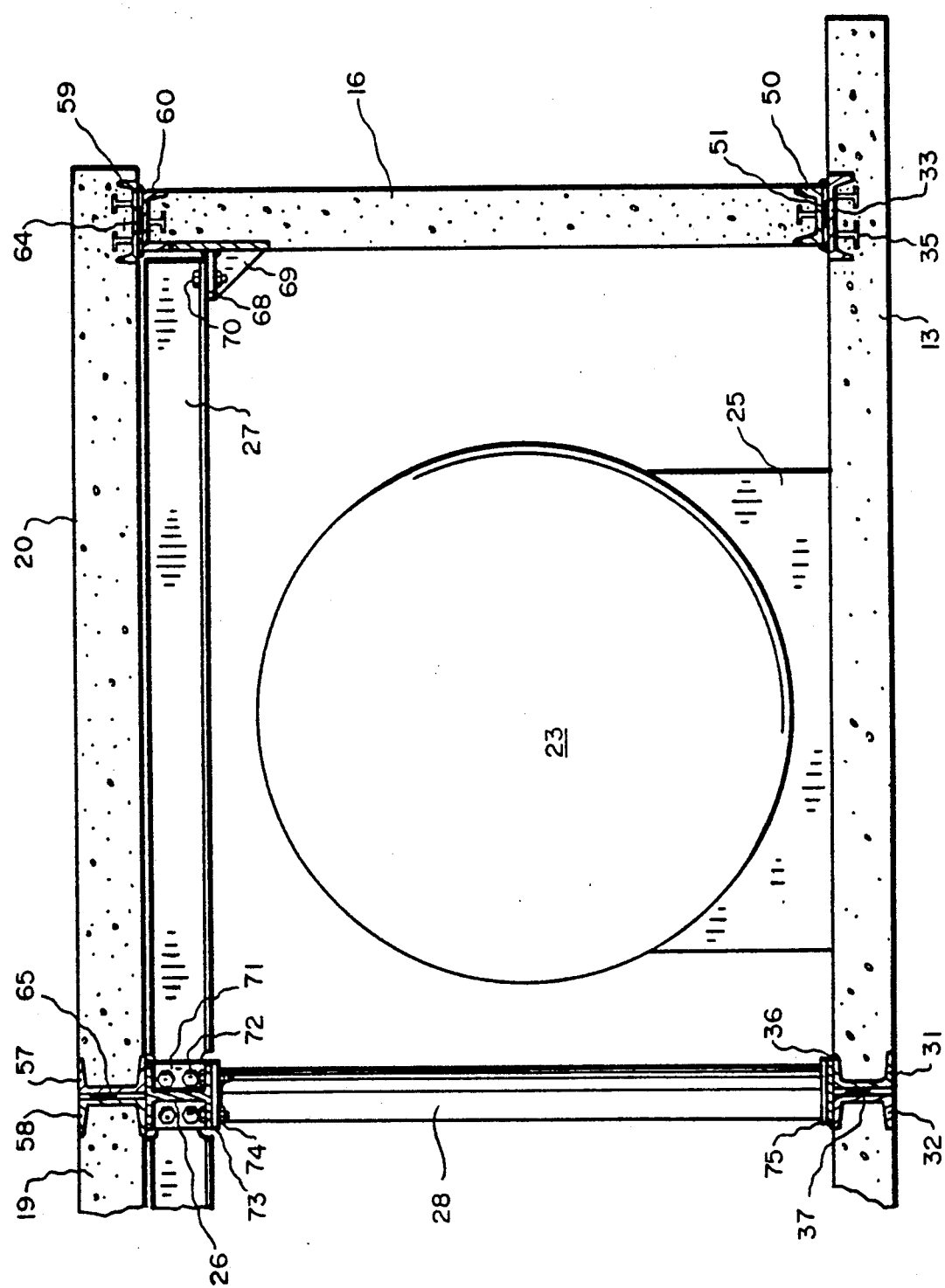

The outer floor panels 11 and 13 also include elongate floor plates 33 sealingly embedded therein while floor panel 12 has floor plates 34 sealingly embedded therein. These floor plates may conveniently take the form of steel plates or steel channels embedded in the floor panels when cast, as shown specifically in FIG. 3. Also as shown in FIG. 3, the channels forming floor plate 33 may include fingers 35 extending therefrom to help secure them to the concrete. Where the floor plates form an angle as floor plates 33 do in panels 11 and 13, see FIG. 4, or intersect an edge, as plates 33 intersect edge 30 in panels 11 and 13, they are welded and smoothed to form a continuous flat surface.

For the three tank embodiment of the structure illustrated, three floor panels are used. Panels 11 and 13 form the outer panels while panel 12 forms an intermediate panel. The floor plates 33 and 34 are aligned in adjacent panels and define a perimeter of the structure and define the position where wall sections are to be placed. It should be noted that a smaller, two tank structure can be formed by using only the two outside floor panels 11 and 13 without intermediate panel 12, or larger structures can be formed by using additional intermediate panels 12. For a single tank structure, a single floor panel may be constructed with floor plates therein defining a rectangular perimeter for the structure.

Figure 4:
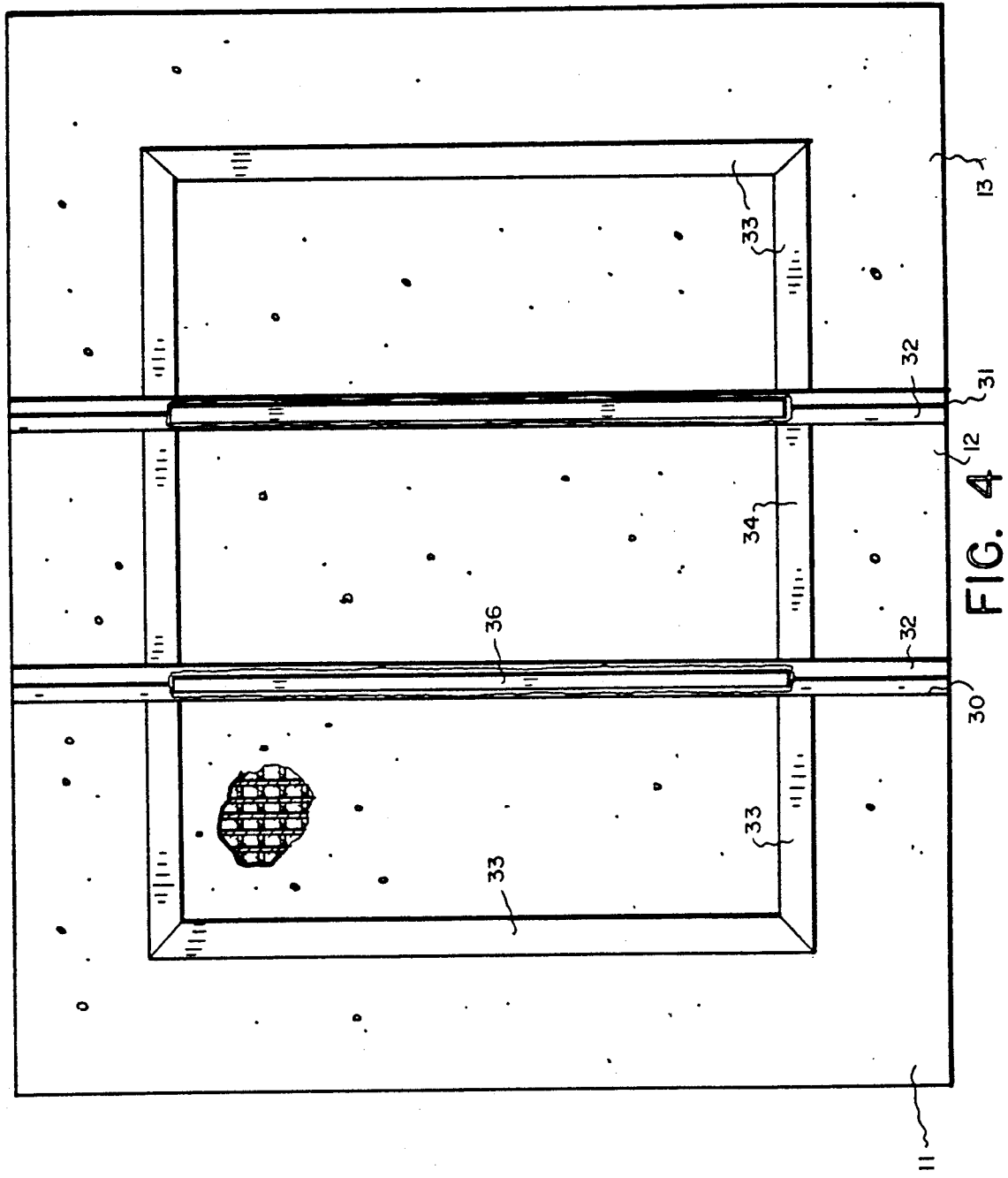

Adjacent floor panels are secured together by welding together the adjacent edges of weldable material. Such welding may run directly between the edges of weldable material, or, as shown in FIGS. 2, 3, and 4, a steel strip 36 may be placed over the adjoining edges and welded in place. Thus, as shown in FIG. 3, strip 36 is placed over the joint between adjoining steel channels 31 and 32 and welded along its edges to the upper surface of channels 31 and 32. The weld is a seal weld so that it completely seals the joint between adjacent floor panels. As shown in FIGS. 2 and 4, strips 36 will extend between end walls 15 and 17, but will not extend under the walls. This is so that the walls will rest on floor plates 33 and 34 and can be sealed thereto. Strips 36 can be installed after the walls are installed, or before.

It is preferred that a secondary seal also be formed between adjacent floor panels and such secondary seal may take the form of a neoprene foam material 37 positioned between the adjacent edges. Such neoprene foam may be sealingly secured in place by epoxy glue.

Figure 5:
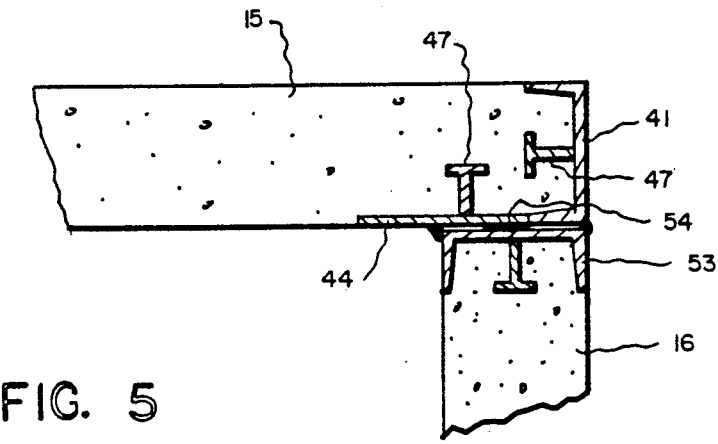
Figure 6:
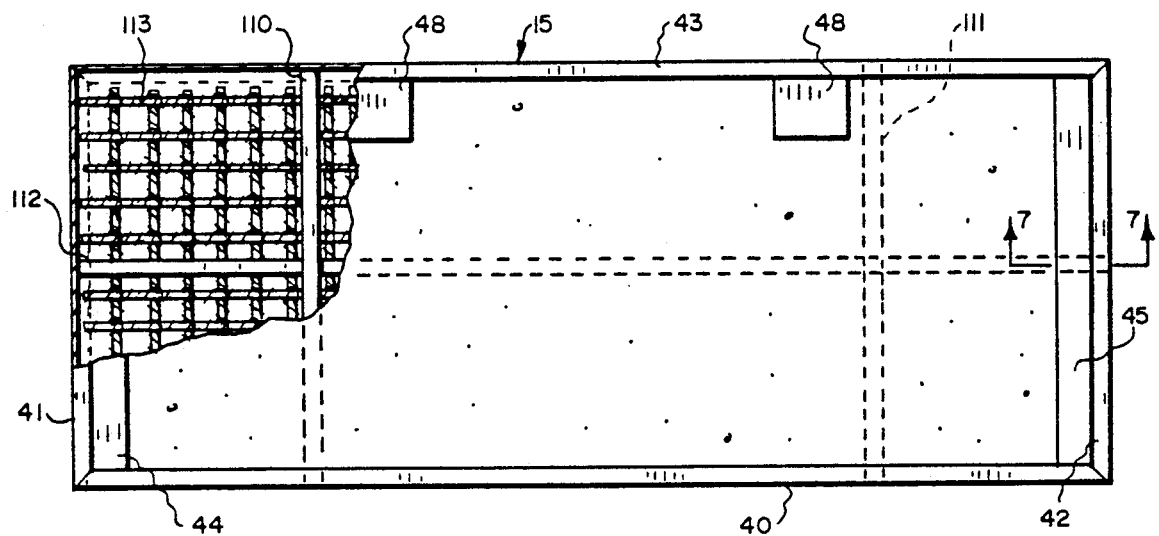
Figure 7:
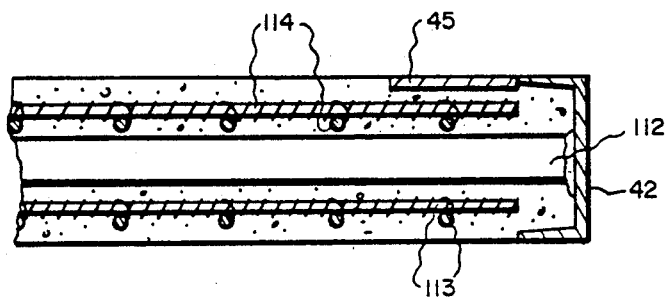

The size of the particular wall panels used for the structure will depend upon the size of the structure to be built as determined by the number and arrangement of floor panels. The wall panels are prefabricated of concrete and have at least the bottom edge and opposite side edges formed of a weldable material. With large structures, the size of individual wall panels may also be determined by the allowable size and weight of panel that can be transported to the construction site. Thus, for large structures, it may be necessary to use multiple wall panels to form a particular wall of the structure, such panels being sealingly secured together similarly to the floor panels. FIG. 6 is a side elevation of the inside surface of a wall panel, such as end wall panel 15. Wall panel 15 is formed of precast concrete with steel channel 40 forming the bottom edge and steel channels 41 and 42 forming the opposite side edges. In the embodiment illustrated, steel channel 43 forms the top edge of the wall panel. While it is not absolutely necessary that the top edge be formed of weldable material, it is preferred that it be made of such material and the preferred construction technique forms a wall panel with all edges formed of steel channel. In order to increase the width of weldable material along the opposite side edges of the inside of opposite wall panels, e.g., for opposite end walls 15 and 17, additional steel plates 44 and 45, FIGS. 5, 6, and 7, are welded along one side of side channels 41 and 42, respectively. The channels and plates include fingers 47, FIG. 5, extending therefrom to help secure them in the concrete. Plates 48 are secured in the wall adjacent the top of the wall by welding them to the edge of top channel 43. Plates 48 are provided for mounting a mounting bracket for roof supports.

The four wall panels 14, 15, 16, and 17 are erected over the floor plates 33 and 34 in the floor, such as by use of a crane, and are initially held in place in any well known manner for holding precast wall panels, such as with bracing. The wall panels are positioned so that at least a portion of the bottom edge, i.e. the inside edge or outside edge, is adjacent to and preferably at least partially overlies the floor plates over the entire length of such edge. As shown in FIG. 3, both the inside edge of bottom channel 50 of wall 16 and the outside edge of bottom channel 50 are over floor plate 34, although it is only necessary that one of the edges be adjacent to or overlap the floor plate. When the walls are in position, the bottom edge channels are seal welded along the adjacent and preferably overlapping edges to the floor plates 33 and 34. Welding along one edge is entirely satisfactory to seal the structure and is all that is necessary, but welding along both edges, as shown in FIG. 3, provides a double seal, if desired. It is also preferred that a secondary seal of neoprene foam 51 be provided as shown in FIG. 3. While the adjacent edges are shown welded directly, and this is presently preferred, a strip of weldable material could be positioned over the adjacent edges and plates and be welded to each, similarly to floor strip 36, to form the seal weld.

With the wall panels in position to form the structure, the side edges of each wall panel will substantially abut side edges of adjacent panels to form the corners of the walls. However, at each corner, one wall panel will overlap the other. Thus, as shown in FIG. 5, wall panel 15 overlaps the entire side edge of wall panel 16 so that while side channel 53 of wall 16 substantially abuts side channel 41, it extends inwardly along wall panel 15 so that the inside side edge of panel 16 is adjacent extension plate 44. The inside edge of side channel 53 is seal welded to adjacent plate 44 to form an inside, wall-to-wall corner seal, and, if desired, the outside edge of side channel 53 can also be welded to side channel 41. Again, it is preferable to include a secondary neoprene foam seal 54 between wall panels.

With the floor and wall portion of the structure assembled and seal welded, an open topped, sealed structure is formed. The storage tanks may now be placed in the structure. Storage tanks 21, 22, and 23 are supported on the floor by cradles 25. The structure is preferably sized with respect to the tanks so that a maintenance person or inspector can walk on the floor completely around the tanks in order to visually inspect the tanks and perform repairs, if necessary. The open topped structure is sufficient to contain any leakage from the tanks and prevent it from contaminating surrounding earth. However, since the structure is fluid tight, it is usually desirable to place a roof over the structure to keep liquid, such as water from rain or snow, out of the structure where it would otherwise collect in the bottom of the structure. This is true whether the structure is above or below ground level. If the structure is above ground level, any type of roof may be used to keep rain and snow out. However, where the structure is located below ground level, as will generally be the case for gas station or similar installations, it is preferred that the roof be flat, at ground level, and capable of supporting vehicles driving thereover.

Where small structures are used, those containing a single tank, for example, a single precast roof panel may be mounted over the structure supported by the four walls of the structure and no additional support is necessary. However, where two or more roof panels are used, it is generally necessary, depending upon the weight to be supported by the roof, to provide support beams in the structure to support the edges of adjacent roof panels where they cross over the structures. Where the tanks are long, additional cross braces may also be desirable.

With the three tank structure illustrated, three separate roof panels 18, 19, and 20 are placed adjacent one another over the structure. As with the floor panels, the edges of the roof panels which will be adjacent other roof panel edges are formed of a weldable material. Thus, outer roof panel 18 has a steel channel forming edge 56, outer roof panel 20 has a steel channel forming edge 57, and intermediate roof panel 19 has steel channels forming opposite side edges 58. Roof panels 18, 19, and 20 will have roof plates 59, FIGS. 3 and 8, forming a perimeter similar to that formed by floor plates 33 and 34 to overlie the top edges of the wall panels. Thus, as shown in FIG. 3, roof plate 59 of roof panel 20, lies over top edge channel 60 of wall 16 and, as shown in FIGS.

2 and 8, roof plate 59 lies over top edge channel 61 of wall 14.

In some instances it may be desirable to construct the structure so that the roof panels are removable without having to break any welds. In such case, the roof panels are constructed so that one or more of the roof panels may be lifted vertically off the structure by means of a crane and tanks removed and replaced, and the roof panels then replaced. If such removability is desired, the roof panels may be secured on the structure to prevent lateral movement with respect thereto by welding brackets 63, FIG. 8, to the roof plates 59 periodically along their length on each of the roof panels 18, 19, and 20 after they are initially positioned over the walls. The brackets 63 will be positioned substantially against the respective walls and prevent lateral movement of the roof panels with respect to the walls. However, the roof panels may be lifted vertically from the walls.

Figure 8:
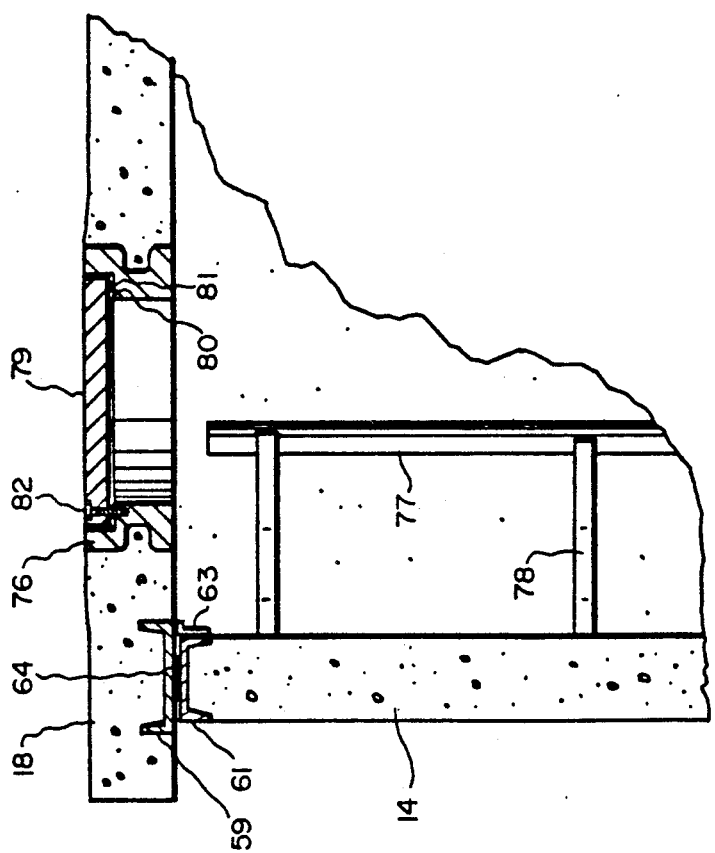

If the roof panels are to be removable, a neoprene foam or similar sealing material 64, FIGS. 3 and 8, will be placed between the roof plates 59 and the top edges of the respective walls, such as top channel 60 in FIG. 3 and top channel 61 in FIG. 8, to seal the joint. Further, a neoprene foam or similar sealing material 65, FIG. 3, will be placed between adjacent edges of adjacent roof panels to form a seal therebetween. In addition the upper surface of the adjacent roof edges may be sealed with a caulk or similar sealant.

Alternately the roof panels may be securely attached to the structures. In such case a seal weld may be made along adjacent portions of the roof plates and the wall top edges, similarly to the welds between the floor plates and wall bottom edges. Additionally, a plate may be seal welded over adjacent edges of the roof panels similarly to plate 36 on the floor panels.

As shown in FIGS. 2 and 6, the structure end walls 15 and 17 include plates 48 along the top edges thereof. The plates 48 are sized and spaced so as to each have a support beam bracket 66 secured thereto, such as by welding. Support beams 26 extend between the two end walls with the ends of the support beams 26 held in place by brackets 66. Support beams 26 are positioned to run beneath and support adjacent edges of adjacent roof panels placed thereover. Thus, as shown in FIG. 3, the illustrated support beam 26 is positioned to run beneath adjacent edges 57 and 58 of roof panels 20 and 19, respectively. The number of support beams 26 will depend upon the number of roof panels used. The three tank embodiment with three roof panels will have two support beams 26 as shown in FIG. 2. If desired, the edges of the roof panels may be welded to the support beams, but in most cases, will merely rest on the support beams.

Where the tanks are long, it may be desirable to include some cross support beams 27. Side walls 14 and 16 include plates 68, FIGS. 2 and 3, to which cross beam support brackets 69 are secured, such as by welding. These brackets are similar to brackets 66 for support beams 26. The support beams 27 may be secured to brackets 69 by bolts 70. Such bolt securement may also be used with support beams 26.

Since support beams 26 run the length of the structure between end walls 15 and 17 parallel to side walls 14 and 16, cross support beams 27 cannot extend the entire width of the structure, but must fit between and be secured to the support beams 26. Thus, as shown in FIG. 3, a bracket 71 is secured as by welding to support beam 26 and cross beam 27 is cut to mate with bracket 71 and be secured thereto by bolts 72.

Uprights 28 are secured to support beams 26 in the areas where cross beams 27 intersect to give additional support. Uprights 28 may take various forms such as pipes or I-beams and have top plates 73 welded thereto which are attached to beams 26 by bolts 74. Bottom plates 75 may rest on strip 36 or be welded thereto.

Access to the interior of the structure is provided by a manway 76, FIGS. 2 and 8, similar to a manhole as installed in streets. The manway is cast into one of the roof panels, here panel 18, to be located near a side wall of the structure, and a ladder 77 is secured to the wall by braces 78 so that a person entering through manway 76 has access thereto to climb to the bottom of the structure. The concrete top surface of the roof panel is raised about an inch around the manway 76 so that water will drain away from the manway.

Manway cover 79 fits into manway 76 against a support shoulder 80 formed therein, and against a sealing gasket 81. A screw 82 secures the manway cover in closed condition.

Access openings 83, FIGS. 1 and 2, are cast into the roof panels 18, 19, and 20 to provide access for filling the storage tanks. These are standard filling openings as currently used and embedded in concrete driveways over buried underground tanks. The normal tank filling pipes 84, FIG. 2, connect in normal manner to the filling access openings 83 and the respective tanks 21, 22, and 23.

Structure end wall 17 is provided with openings 85 cast therein adjacent the ends of the tanks to allow pipes 86 from the tanks to pass therethrough. These openings are formed by four inch PVC pipe sleeves to which four inch PVC pipe is sealingly attached by normal gluing on the outside of the structure to extend to the destination of the pipe, such as the gas islands in a service station. The pipes 86 extending from the tanks to carry the fluid discharging therefrom, such as gasoline from a storage tank to a gasoline pump, are normally about two inch pipes and pass inside the sealed four inch PVC pipes so that any leakage from pipes 86 will be directed back into the structure to be detected, rather than leaking into the ground.

Also extending through end wall 17 is an electrical conduit 90 for carrying wiring to the structure, a ventilation pipe 91 which is open to the atmosphere through a vent opening, not shown, which may be valved so that it can be opened and closed, if desired, and an air outlet pipe 92 which extends along the length of the upper portion of the structure and has inlet openings 93 along its length. During forced ventilation of the inside of the structure, air is drawn out of the structure through pipe 92 by a fan in air flow communication therewith and fresh air freely flows into the structure through pipe 91.

Figure 9:
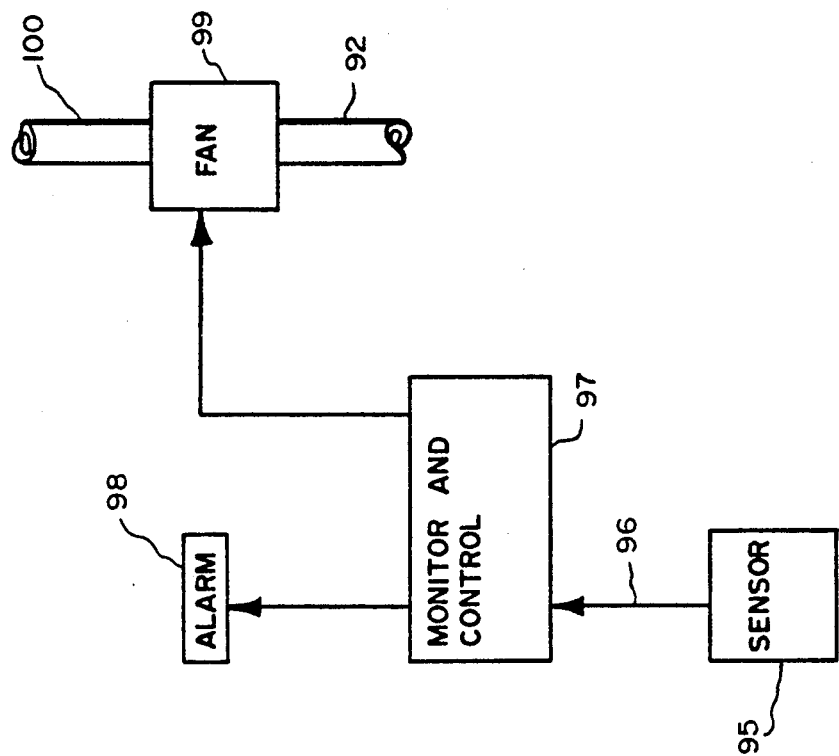

A sensor is provided and positioned within the structure to detect leakage from the tanks. Various types of sensors may be used. When the tanks contain gasoline or other volitile liquids, the sensor may take the form of a gas sensor to detect presence and build up of predetermined gases or fumes in the structure such as a low explosive limit sensor. Such a sensor 95, FIGS. 2 and 9, is shown positioned in the structure to detect the presence of toxic or explosive fumes and gases in the structure. Sensor 95 is connected by wires 96 passing through conduit 90 to a monitor and control unit 97, FIG. 9, which monitors sensor 95. If sensor 95 detects the presence of toxic fumes or gases, monitor and control unit 97 causes an alarm 98 to be activated. This alarm can be an audible or visual alarm, or both. Upon detection of an alarm condition, the monitor and control unit also activates an explosion proof, suction fan 99 which draws air out of the structure through pipe 92 and an exhaust outlet 100. Fresh air then enters the structure through pipe 91. The sensors and monitor and control units are well known in the art so are not described in further detail. The fan 99 may also be activated manually when it is desired to vent the structure. The vents and fan are preferably designed to change all air in the structure in less than fifteen minutes.

For an underground structure, it is preferred that the floor panels extend beyond the exterior perimeter of the walls a distance between one to four feet, as shown in FIGS. 1 and 2. This creates a lip upon which earth 102 is piled and compacted. The earth on the lip prevents earth shear and keeps the structure stationary, i.e. resists floating of the structure, during times of high water table or flooding.

When used in gasoline stations or truck stops, the structure will usually be buried below a working surface of the station over which vehicles, including large trucks, will travel. In such instances, the structure will be positioned in the ground so that the top of the roof panels are even with the concrete or black-top surfacing 103, FIG. 1, in the station to provide a smooth surface. Further, the structure will be designed to carry the load passing over it.

The various precast concrete panels used in the construction of the structure will vary in size and thickness depending upon the size of the structure to be built and the loading on the structure. The calculations to determine the thicknesses of the panels relative to size and loading are standard engineering calculations commonly performed for various structures.

In building the structure, the edges of the wall panels should be straight and square. It has been found that the wall panels may be conveniently manufactured by constructing a frame of steel channels. The steel channels form the edges of weldable material. Referring to FIG. 6, the form is constructed of steel channels 40, 41, 42, and 43. These steel channels are braced by cross braces or pipes 110 and 111 welded to and extending between opposite channels 40 and 43 intermediate their length. A cross brace on pipe 112 is welded to and extends between opposite channels 41 and 42. The cross bracing maintains the channels straight and keeps the angles between adjoining channels square at ninety degrees during pouring and setting of the concrete. The size of the channels will be chosen to match the thickness of the wall. For example, if an eight inch thick wall is desired, eight inch channel will be used. If a ten inch thick wall is desired, ten inch channel will be used. The various other necessary plates such as side extension plates 44 and 45 are welded to the channels as well as bracket plates 48, if necessary. The frame is placed on a surface for casting the concrete and a lower lattice or matrix 113, FIGS. 6 and 7, of reinforcing steel bar will be constructed, as will an upper lattice or matrix 114. With the upper and lower matrixes constructed and positioned, the concrete is poured into the frame, smoothed, and allowed to set. This produces a wall panel with weldable edges that are straight and square to facilitate rapid assembly of the structure. Other panels, such as roof and floor panels could be similarly constructed, however, such panels generally do not need to be surrounded by weldable material and it has been found that merely casting in a steel channel along the one or two edges required will produce a straight edge of weldable material for mating with another such edge. The exactness of all four edges of the floor and roof panels is not as critical as with the wall panels.

It is also presently preferred that polypropylene fibers be added to the concrete mix when making the various precast panels for the structure. The polypropylene fibers increase the resistance of the concrete to water and other fluid migration. It also gives the concrete increased strength and resistance to cracking.

Whereas this invention is here illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

We claim:

1. A liquid tight structure particularly suited to having liquid storage tanks located therein, comprising:
   a concrete floor;
   elongate floor plates of a weldable material sealingly secured in said concrete floor defining a perimeter of the structure;
   precast concrete wall panels, each of said wall panels having a bottom edge portion and opposite side edge portions of a weldable material, said wall panels being positioned on said concrete floor so that the bottom edge portion of weldable material of each wall panel is adjacent to an elongate floor plate, and each of said side edge portions of weldable material is adjacent to another side edge portion of weldable material; and
   seal welds between the bottom edge portions and the floor plates and between adjacent side edge portions to form a fluid tight structure.

2. A structure according to claim 1, additionally including roof means extending over the top of the structure.

3. A structure according to claim 2, wherein the roof means includes means to prevent lateral movement of the roof means with respect to the structure.

4. A structure according to claim 3, wherein the roof means includes roof plates of weldable material secured thereto and adapted to be positioned adjacent the wall panels when the roof means is positioned over the structure, and wherein the means to prevent lateral movement of the roof means includes means welded to the roof plates to abut the wall panels and prevent lateral movement of the roof means with respect to the wall panels.

5. A structure according to claim 4, wherein the roof means includes at least one precast concrete roof panel.

6. A structure according to claim 5, wherein the roof means includes at least two adjacent precast concrete roof panels.

7. A structure according to claim 6, wherein sealing material is placed between adjacent roof panels over the structure.

8. A structure according to claim 7, wherein the sealing material is a neoprene foam.

9. A structure according to claim 7, wherein a sealing material is placed between the roof means and the wall panels upon which the roof means rests.

10. A structure according to claim 2, wherein the roof means includes at least one precast concrete roof panel, wherein the structure is adapted to be underground with at least one roof panel at ground level, and wherein at least one roof panel is constructed to support a vehicle thereon.

11. A structure according to claim 10, wherein support beam means is provided in the structure to increase the support of the roof panels over the structure.

12. A structure according to claim 2, wherein the wall panels have top edge portions of weldable material, the roof means include roof plates of weldable material secured thereto and positioned to at least partially overlie the weldable top edge portions of the wall panels, and wherein the roof plates are welded to the top edge portions of the wall panels to secure the roof means to the structure.

13. A structure according to claim 2, wherein the roof means includes at least one precast concrete roof panel, and wherein manway means is included in the roof means to provide access to the interior of the structure.

14. A structure according to claim 2, wherein storage tanks for storing hazardous fluids are located in the structure and wherein sensor means is located in the structure to sense leakage from the storage tanks and provide an indication when leakage is detected.

15. A structure according to claim 14, wherein the structure includes a ventilation system for ventilating the structure.

16. A structure according to claim 15, wherein the ventilating system includes means associated with the sensor for causing operation of the ventilating system when leakage is detected.

17. A structure according to claim 16, wherein the sensor senses presence of selected gases in the air within the structure.

18. A structure according to claim 1, wherein the concrete floor includes at least two adjacent, precast concrete floor panels, adjacent edges of the concrete floor panels being formed of weldable material.

19. A structure according to claim 18, including seal welds directly between adjacent floor panel edges of weldable material.

20. A structure according to claim 18, including a seal plate of weldable material extending over adjacent floor panel edges between opposite wall panels and welded to the weldable material of the adjacent floor panel edges.

21. A structure according to claim 18, wherein a sealing material is placed between adjacent floor panel edges.

22. A structure according to claim 1, wherein the floor extends beyond the outside perimeter of the walls of the structure to form a lip which is covered with earth when the structure is located beneath ground level to counteract any tendency of the structure to rise in the ground from its initial position.

23. A structure according to claim 22, wherein the floor extends beyond the outside perimeter of the walls a distance between one and four feet.

24. A structure according to claim 1, wherein the perimeter defined by the floor plates is such that the bottom edges of the wall panels at least partially overlie the floor plates.

25. A structure according to claim 1, wherein the wall panels have an inside bottom edge and an outside bottom edge, and the inside bottom edge is the bottom edge portion welded to the floor plates.

26. A structure according to claim 1, wherein the wall panels have an inside bottom edge and an outside bottom edge, and the outside bottom edge is welded to the floor plates.

27. A structure according to claim 1, wherein the wall panels have an inside side edge and an outside side edge, wherein one side edge portion of adjacent wall panels forming corners of the structure overlap the side edge portion of the other adjacent panel to form an inside corner of the structure, wherein the side edge portions of weldable material of the overlapping wall panels extend inwardly a distance sufficient to be positioned adjacent the inside edge of the other adjacent panel, and wherein the inside corners of the structure are seal welded.

28. A structure according to claim 1, wherein at least some of the concrete includes polypropylene fibers therein.

29. A structure according to claim 1, wherein the precast concrete wall panels comprise:
   a rectangular frame of a weldable material, said rectangular frame having pairs of opposite sides;
   braces secured and extending between opposite sides of the rectangular frame intermediate their length to hold the pairs of opposite sides straight and at right angles to one another;
   concrete reinforcing material positioned within the frame;
   and concrete within the frame.

30. A structure according to claim 29, wherein the weldable material forming the rectangular frame is steel channel.

31. A structure according to claim 30, wherein the concrete includes polypropylene fibers therein.

32. A precast, rectangular concrete panel with edges of a weldable material for use in structure construction, comprising:
   a rectangular frame of a weldable material, said rectangular frame having pairs of opposite sides;
   braces secured and extending between opposite sides of the rectangular frame intermediate their length to hold the pairs of opposite sides straight and at right angles to one another;
   concrete reinforcing material positioned within the frame;
   and concrete within the frame.

33. A method of constructing a fluid tight structure particularly suited to having fluid storage tanks located therein, and wherein a concrete floor having elongate floor plates of a weldable material sealingly secured in the floor and defining a perimeter of the structure and concrete wall panels having bottom edge portions and opposite side edge portions of a weldable material are available, comprising the steps of:
   placing a floor in desired position for the structure;
   positioning wall panels over the floor so that the bottom edge portions of weldable material are adjacent to the floor plates and side edge portions of weldable material are adjacent other side edge portions of weldable material;
   seal welding the floor plate to adjacent wall bottom portions of weldable material to seal the bottom edges of the walls to the floor; and
   seal welding adjacent wall side edge portions of weldable material to seal the edges of adjacent wall panels to provide a fluid tight structure.

34. A method of constructing a fluid tight structure according to claim 33, wherein concrete floor panels having selected edges formed of a weldable material are available, wherein the step of placing a floor in desired position for the structure includes the steps of positioning at least two floor panels adjacent to one another so that adjacent edges of the adjacent floor panels are of weldable material, and the additional step is included of seal welding adjacent edges of weldable material of adjacent floor panels at least where such adjacent edges extend between wall panels.

35. A method of constructing a fluid tight structure according to claim 33, additionally including the step of placing roof panels over the structure to form a structure roof.

36. A method of fabricating a rectangular, precast concrete panel with edges of a weldable material for use in structure construction comprising the steps of:

fabricating a rectangular frame from a weldable material, said frame having pairs of opposite sides;

bracing the rectangular frame by securing braces to and extending between opposite sides of the rectangular frame intermediate their length to hold the pairs of opposite sides straight and at right angles to one another;

positioning concrete reinforcing material within the frame;

pouring concrete into the frame so that the concrete fills in the frame; and allowing the concrete to cure to produce a prefabricated concrete panel having edge portion of a weldable material.

* * * * *